US008427364B1

(12) United States Patent
Friesel

(10) Patent No.: US 8,427,364 B1
(45) Date of Patent: Apr. 23, 2013

(54) METHOD AND SYSTEM FOR SCANNING A RADAR SEARCH VOLUME AND CORRECTING FOR 3D ORIENTATION OF COVARIANCE ELLIPSOID

(75) Inventor: Mark A. Friesel, Ewing, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 299 days.

(21) Appl. No.: 12/879,374

(22) Filed: Sep. 10, 2010

(51) Int. Cl.
*G01S 13/00* (2006.01)

(52) U.S. Cl.
USPC .................................. 342/95; 342/73; 342/85

(58) Field of Classification Search .................... 342/73, 342/85, 95–97, 154, 195, 350, 357.23, 357.34, 342/357.44, 359, 368, 408, 420
See application file for complete search history.

(56) References Cited

U.S. PATENT DOCUMENTS

| 4,467,447 | A | 8/1984 | Takahashi et al. |
| 5,890,012 | A | 3/1999 | Poisner |
| 6,297,763 | B1 * | 10/2001 | Thomson et al. ............... 342/75 |
| 7,184,036 | B2 | 2/2007 | Dimsdale et al. |
| 7,221,307 | B1 | 5/2007 | Friesel |
| 7,330,151 | B1 * | 2/2008 | Monk et al. .................... 342/359 |
| 8,044,841 | B1 * | 10/2011 | Boardman et al. ............... 342/62 |
| 8,115,148 | B1 * | 2/2012 | Boardman et al. ........... 244/3.14 |
| 8,134,492 | B1 * | 3/2012 | Friesel ............................. 342/95 |
| 8,184,041 | B1 * | 5/2012 | Friesel ........................... 342/158 |
| 8,253,621 | B1 * | 8/2012 | Friesel ............................. 342/95 |
| 2006/0202886 | A1 | 9/2006 | Mahapatra et al. |
| 2007/0018882 | A1 | 1/2007 | Manoogian et al. |
| 2008/0153414 | A1 | 6/2008 | Ho et al. |
| 2008/0210016 | A1 | 9/2008 | Zwirn et al. |
| 2010/0282894 | A1 * | 11/2010 | Guertin et al. ............... 244/3.19 |

OTHER PUBLICATIONS

Eberly, D., "Perspective Projection of an Ellipsoid", Geometric Tools, LLC., http://www.geometrictools.com, Created Mar. 2, 1999, last Modified Mar. 1, 2008.

* cited by examiner

*Primary Examiner* — John B Sotomayor
*Assistant Examiner* — Marcus Windrich
(74) *Attorney, Agent, or Firm* — Howard IP Law Group, PC

(57) ABSTRACT

A method and radar system for estimating a radar search volume, includes acquiring covariance information relating to a cued direction, the covariance information having an ellipsoidal shape, projecting the ellipsoidal shape covariance information onto a range-traverse plane and onto the range-elevation plane to produce a covariance ellipse on the range-traverse and range-elevation planes; and determining the maximum extents in each of the range-transverse and range-elevation planes wherein the azimuth and elevation extents define the search volume.

20 Claims, 14 Drawing Sheets ued" search. If the selected volume is too large, the search may time-out before completion of the search, and if too small, may not find the relevant target(s).

METHOD AND SYSTEM FOR SCANNING A RADAR SEARCH VOLUME AND CORRECTING FOR 3D ORIENTATION OF COVARIANCE ELLIPSOID

FIELD

The present disclosure relates to radar systems. More particularly, the present disclosure relates to a method and system for improving radar acquisition search volumes.

BACKGROUND

A naval radar system searches space under control of command and decision processing by means of a plurality of sequential directional beams which may be pointed in a given direction. Command and Decision determines the acquisition face to be searched. The radar beam is directed to each angle so as to cover the entire search face. This type of searching is subject to time constraints, as the beam must dwell at the current beam angle for a sufficient time for the transmitted radar signals or pulses to travel to the target, which might be at the maximum allowable range, and for the reflection to return to the radar.

The naval radar can operate in a volume search mode. When information becomes available from another source, such as a cooperating radar, about the possible presence of a target in a nominal given direction or location, it may be desired to examine a volume about the nominal given direction in an attempt to acquire the target. This is termed a "cued" search. If the selected volume is too large, the search may time-out before completion of the search, and if too small, may not find the relevant target(s).

U.S. patent application Ser. No. 12/208,588 generally describes a method for searching an angular region of the radar acquisition search volume (search volume) about a given cued direction and with a given maximum search range. The radar search of the designated volume is performed with sequentially generated radar beams having defined beamwidths. The method comprises the steps of acquiring the nominal track position and velocity (cue information) and time, and error information describing the uncertainty in the cue information. This error information may be presented together with the cue information. From the error information, the azimuth and elevation extent (the acquisition or search face) of the search volume about the cue direction is determined.

In the scenario 10 of FIG. 1, a line 12 defines the horizon. A ship (ownship) 14 carries a radar system, portions of which are illustrated as 16, and a computer processor, illustrated as a block 14c. A target 20 is at a distance from ownship 14, and is observed along a line-of-sight represented by a dot-dash line 24 by means of sensors (not separately illustrated) mounted on a ship 22. Ship 22 obtains information about the location of target 20. Since ownship 14 (and possibly other ships and assets associated with ship 22) may not be aware of the presence of target 20, ship 22 transmits coordinates of the target to other assets and in particular to ownship 14. This transmission may be made by any communication path, such as, for example, the uplink 30U and downlink 30D associated with a communication spacecraft 32. Computer processing aboard ship 22 may evaluate the quality of the target, and transmit target quality or error information together with the target coordinates.

In FIG. 2, ownship 14 includes a communication antenna 212 which is intended for communication with other assets, including the communication represented in FIG. 1 by path 30D. This communication, including information relating to the location of target 20 and the errors associated with the location, is coupled to a command and decision function, illustrated as a block 216. Block 216 of ownship 14 digitally processes the target location information from ship 22 of FIG. 1 in computer (processor) 14c, and from this location information determines the target azimuth and elevation angle relative to ownship 14, and the azimuth and elevation extent of the search or acquisition face required to acquire the target with its own sensors.

The target azimuth and elevation relative to ownship 14 of FIG. 2, and the azimuth and elevation extent of the acquisition face (see FIG. 3A) required by the errors in target azimuth and elevation, are transmitted from Command and Decision block 216 of FIG. 2 to an ownship radar beam control illustrated as a block 218, which may also be part of computer 14c, or which may be a separate computer. Radar beam control 218 commands the generation of transmit and receive beams by radar array antenna face 220. These beams are "pencil" or narrow beams, as known in the art. A representative pencil beam is illustrated as 222. Radar beam control 218 may also receive commands from other functional modes, such as wide-area search modes, illustrated together as a block 224.

The radar beam controller 218 of FIG. 2, together with the antenna face 220, produces sequential pencil beams in directions which, in conjunction with other pencil beams, suitably search the volume of space defined by the combination of an acquisition face in conjunction with the desired range.

FIG. 3A is a representation of a search or acquisition face 310 defined by sequential beam generation by the radar sensor 16 of FIG. 2. The azimuth and elevation directions are indicated by arrows. In FIG. 3A, the nominal target azimuth and elevation, as specified by the target azimuth and elevation angle relative to ownship 14 generated by block 216, appears as a + symbol at the center of the acquisition face 310.

A "cross-section" of each pencil beam is illustrated as a circle. Representative circles are designated by the number 320. The pencil beams are directed so that the beams overlap at a given power level. This overlap is indicated in FIG. 3A by the overlap of the circles. Those skilled in the art will understand that the "magnitude" of the overlap depends upon the "beamwidth" of the beams, the relative placement of the beam centers by the radar, and the attenuation or "signal" level at the overlap. Also in FIG. 3A, the overlapping beams provide coverage of a region defined by a rectangular outline 312. The azimuth "extent" of the coverage region is defined by the arrow designated $A_{ext}$, extending in the horizontal direction from a vertical centerline 314 to the outline 312. The elevation "extent" of the coverage region is defined by the arrow designated $E_{ext}$, extending in the elevation or vertical direction from a horizontal centerline 316 to the outline 312.

The relationship of the search or acquisition face to the overall search volume associated with the face is illustrated in FIG. 3B. In FIG. 3B, the acquisition search face is designated as 310, and the range provides a third dimension which defines the search volume 350.

It is critical that the calculated size of the search volume describe provided covariance/errors as closely as possible because the radar can only use minimum and maximum range, nominal azimuth and elevation, and azimuth and elevation extents.

Existing methods for determining search volumes produce inaccurate descriptors of the volume. One of these existing methods uses projection for estimating the search volume, but does not incorporate the significant effects of orientation of the error or covariance ellipsoid. Cross-range extents of the search volume to either side of center contain unnecessary error by being displaced in one or the other direction.

If the descriptors, i.e., the estimated elevation, azimuth, and range extents, of the search volume are inaccurate, the radar system may waste resources searching where it is unlikely to find a target, when such resources could have been allocated for other activities. Further, inaccurate descriptors may cause the radar system not to search where the target is likely to be. In addition, predetermined requirements may not be met if the minimum probability of containing a target cannot be estimated.

Accordingly, an improved method and system is desired for determining or estimating the elevation, azimuth, and range extents of search volume.

SUMMARY

A method is disclosed herein for estimating a radar search volume. In the method, covariance information relating to a cued direction is acquired, the covariance information having an ellipsoidal shape. The ellipsoidal shape covariance information is projected onto a range-traverse plane and onto the range-elevation plane to produce a covariance ellipse on the range-traverse and range-elevation planes. The maximum extents in each of the range-traverse and range-elevation planes is determined wherein the azimuth and elevation extents define the search volume.

A radar system is disclosed for searching an angular region of a radar search volume. The radar system comprises a radar beam generator for generating radar beams at a search face of the search volume, a source for providing an ellipsoidal shape covariance information relating to a cued direction, and a processor coupled to the source and to the radar beam generator. The processor executes instructions for projecting the ellipsoidal shape covariance information onto a range-traverse plane and onto the range-elevation plane to produce a covariance ellipse on the range-traverse and range-elevation planes, and for determining the maximum extents in each of the range-traverse and range-elevation planes, the azimuth and elevation extents defining the search volume.

DETAILED DESCRIPTION

As noted above, the information relating to the cue direction toward which the radar is to be directed includes direction and error or covariance information. The covariance information may be viewed as having the shape of an ellipsoid defined by elevation, range, and a traverse "azimuth" coordinates.

Figure 2:
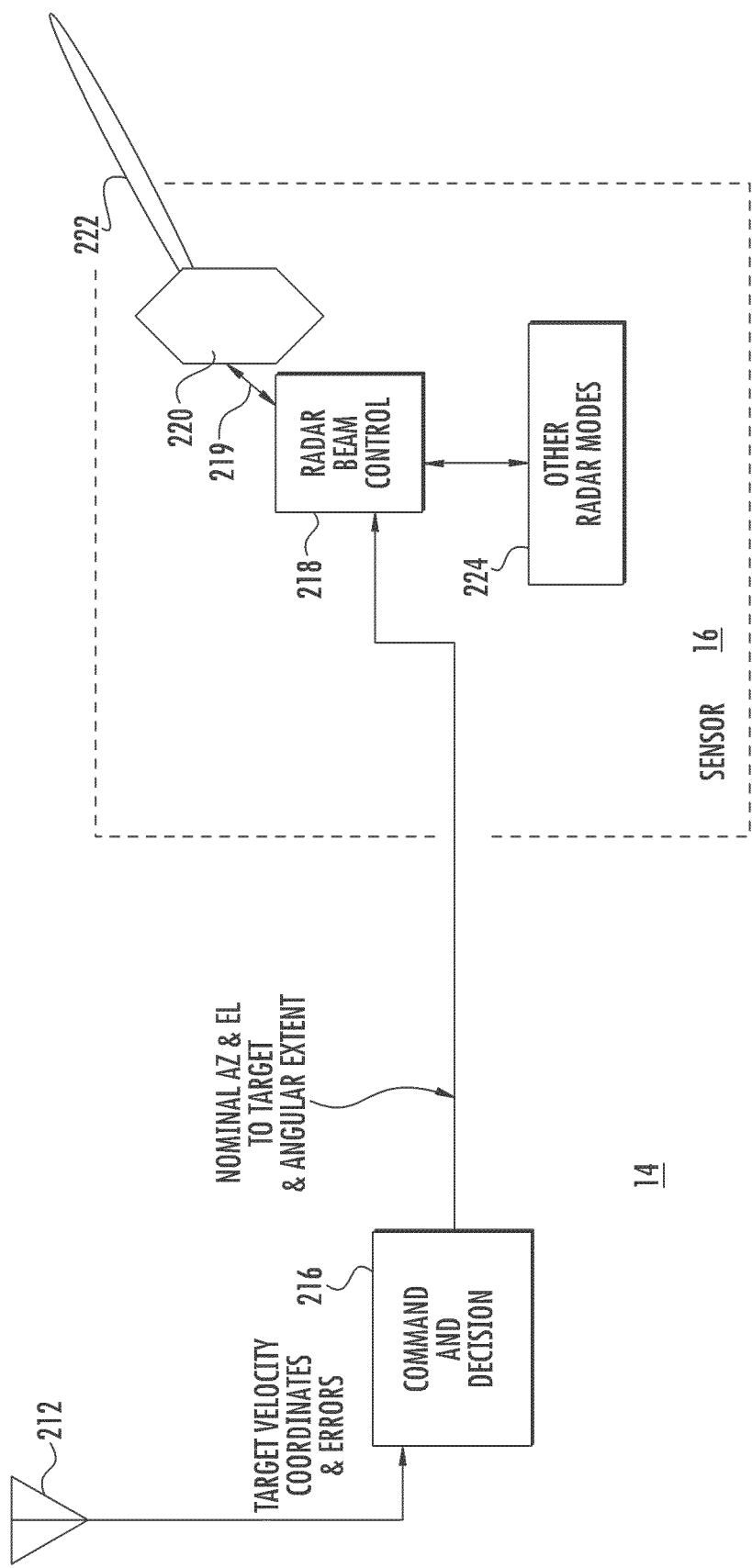
FIG. 2 is a simplified block diagram illustrating various shipboard functions relating to sensor acquisition of the target of FIG. 1.
Figure 3A:
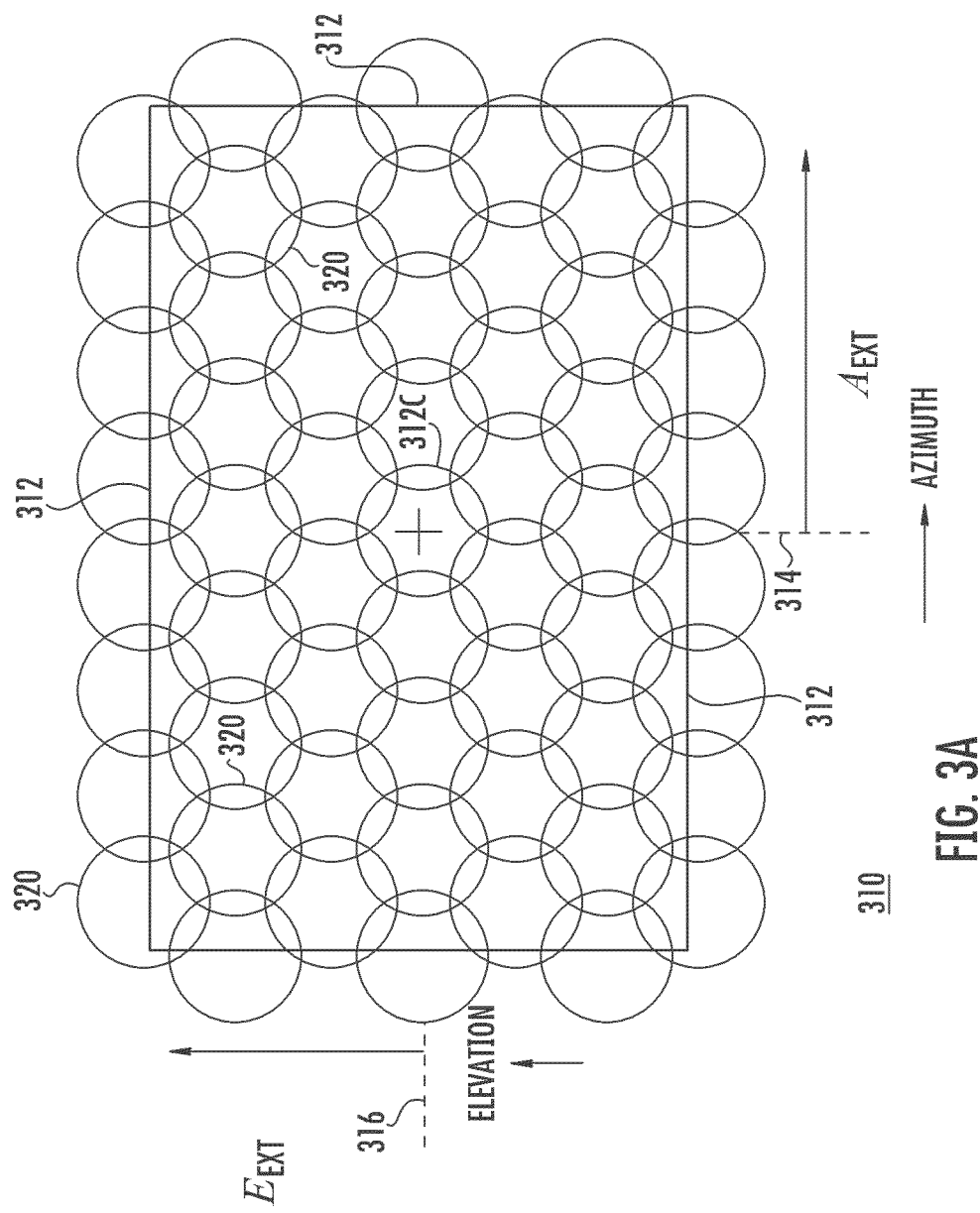
FIG. 3A is a view of a representative search face as described in U.S. patent application Ser. No. 12/208,588.
Figure 3B:
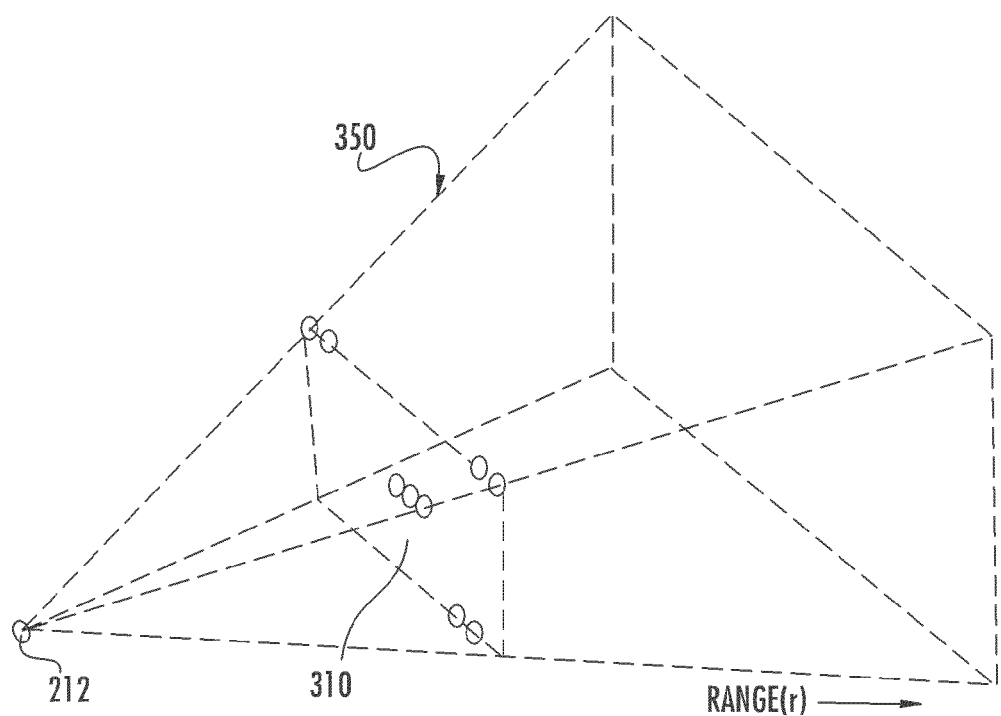
FIG. 3B is a representation of the search face of FIG. 3A with the addition of range as a parameter.
Figure 5A:
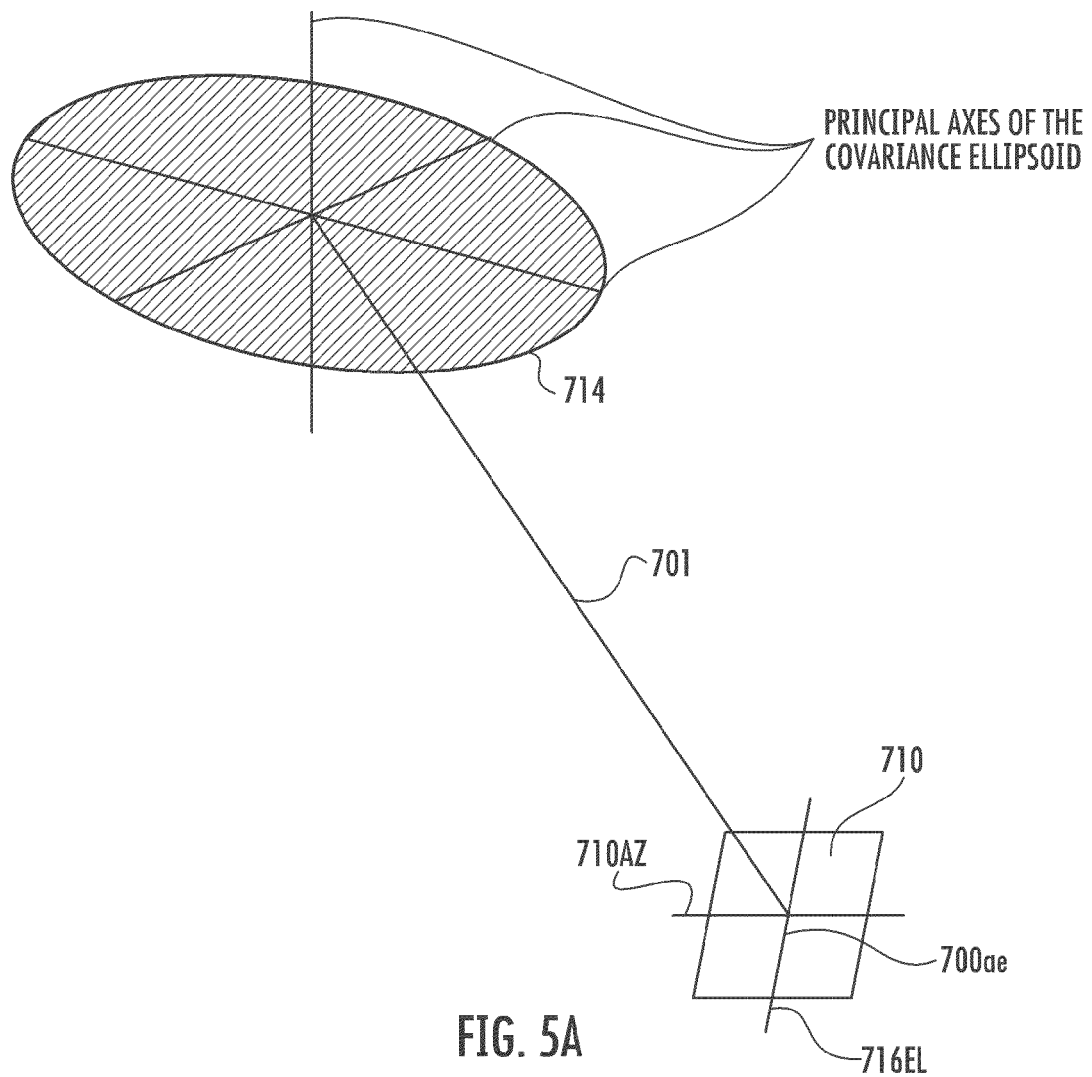
FIG. 5A is a covariance ellipsoid illustrating projection onto an azimuth-elevation plane.

FIG. 5A is simplified representation of a covariance ellipsoid 714 centered on the range axis or vector 701, and the range axis 701 is assumed to be normal or orthogonal to the viewplane 710, which may be plane of the radar array antenna face 220 (FIG. 2). The viewplane 710 includes viewpoint 700ae, azimuth axis 710AZ and elevation axis 710EL. The principal axes of the covariance ellipsoid 714 are arbitrary with respect to the viewplane axes.

Figure 5B:
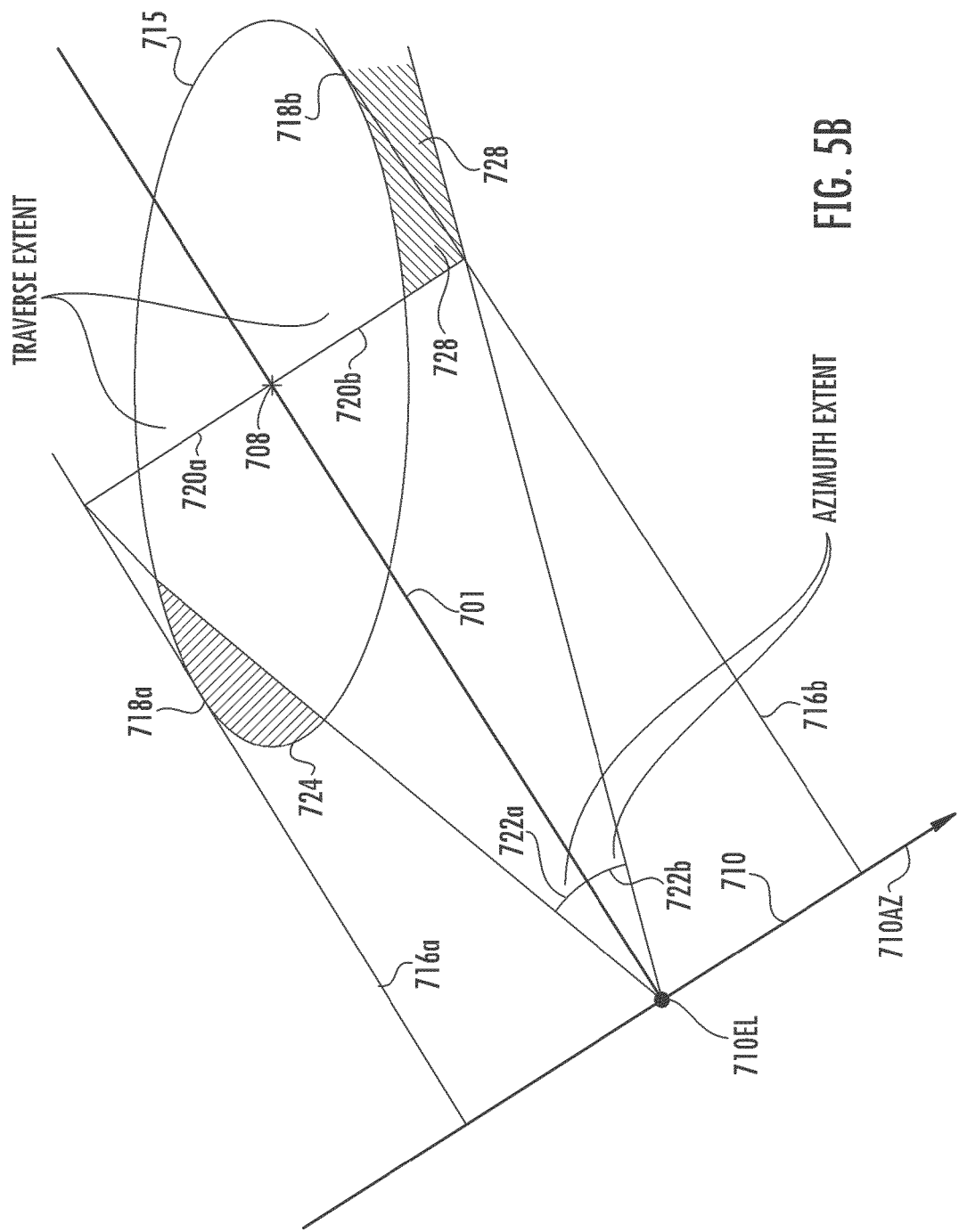
FIG. 5B is an ellipse formed by projection of the covariance ellipsoid of FIG. 5A onto the AZ-range plane.

FIG. 5B illustrates the geometry associated with a scheme for determining extent and depicts the earlier mentioned viewplane (projection plane) 710 of the radar array antenna face 22 (FIG. 2), the range vector or axis 701, which extends normal to the viewplane 710, which is to say from the radar to the nominal target position 708, the elevation axis 710EL of the radar, the azimuth axis 710AZ of the radar, and a two-dimensional covariance ellipse 715 projected from the three-dimensional covariance ellipsoid 714, which represents the region or volume of space having some designated or estimated probability of containing the target. To determine the search volume for the radar in terms of azimuth, elevation and range, we need to know the extent of the covariance ellipsoid 714 in azimuth, elevation, and range. The projections of the ellipsoid 714 onto the viewplane 710 and onto the range vector 701 are needed.

The azimuth extent of ellipsoid 714 on the viewplane 710 is indicated by projection lines 716a and 716b, which projection lines are parallel with the range axis 712 and which are tangent to the ellipse surface 715 at tangent points 718a and 718b, respectively. Next, the traverse extents 720a and 720b are found. They are equal in length, so only one need be determined. The angular extents 722a and 722b are determined. These angular extents are equal and are determined by the angles between the nominal range axis 712 and the traverse extents, given the range to the target. This method of extent determination may be less accurate than desired, because it may exclude a portion of the ellipsoid 714 to be searched, and include a portion outside of the ellipsoid 714 that should be searched. The portion of the ellipsoid 714 that is undesirably excluded from the search region to be searched is represented in FIG. 5B by the hatched region 724 of ellipse 715. The portion of the ellipsoid 714 that is undesirably included in the search volume which should not be so included is represented in FIG. 5B by hatched region 728 of ellipse 715. It is undesirable to include in search regions in which the target is unlikely to be found or to exclude search regions in which there is a probability of finding the target.

Figure 5C:
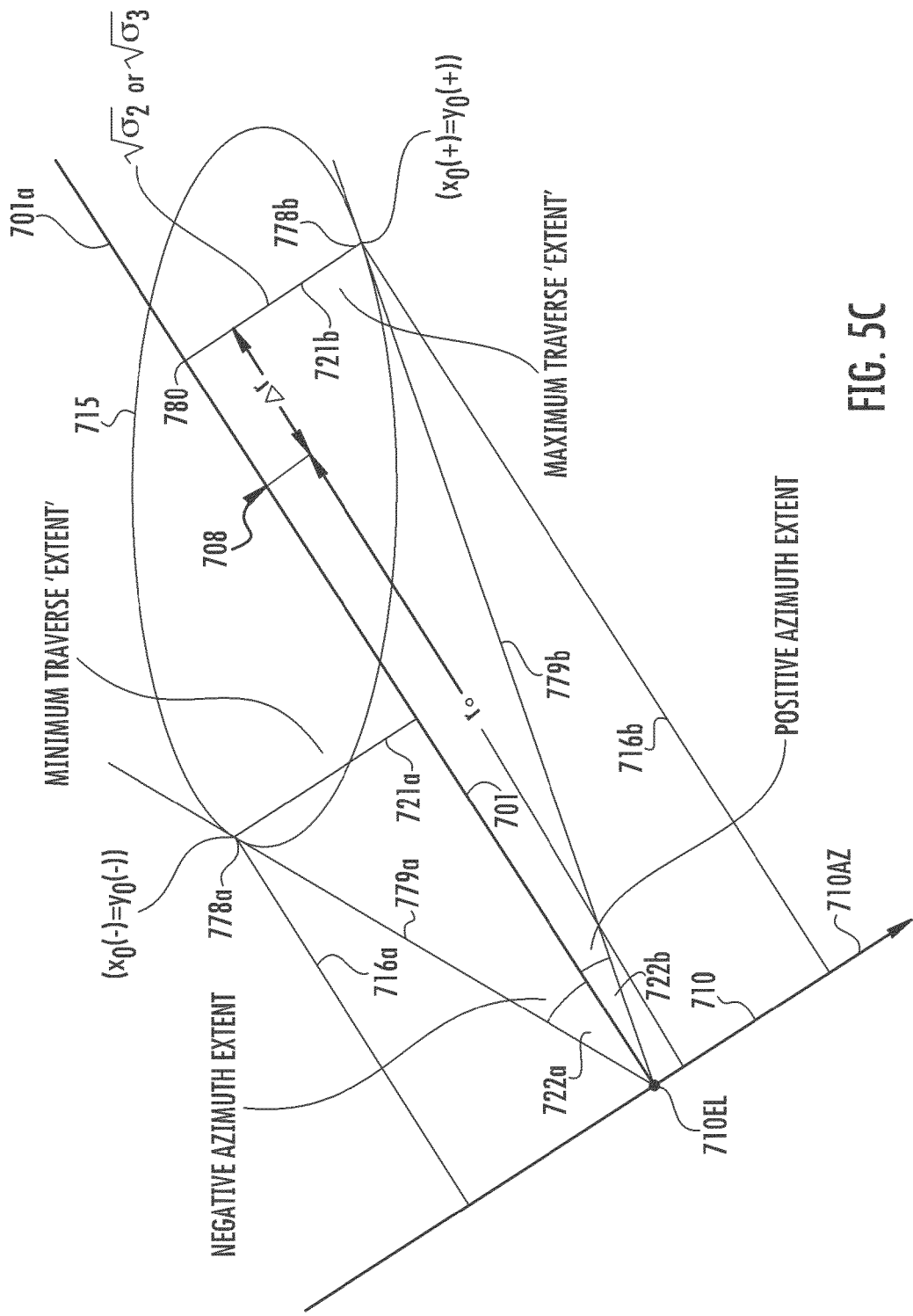
FIG. 5C is a simplified perspective or isometric view aiding in understanding the nature of the errors in extent arising from the 3D covariance ellipsoid of FIG. 5B.

FIG. 5C, illustrates an aspect of the disclosure where traverse extents 721a and 721b are determined at the ranges to the points of tangency, rather than at the nominal range to the target location 708, as illustrated in FIG. 5B. In FIG. 5C, reference numeral 721a identifies the minimum traverse extent of the covariance ellipse 715 and reference numeral 721b identifies the maximum traverse extent of the covariance ellipse 715. The points of tangency of the traverse extents 721a and 721b are designated 778a and 778b, respectively. The lengths of the traverse extents 720a and 720b of FIG. 5B are the same as the lengths of the traverse extents 721a and 721b of FIG. 5C, but the traverse extents 721a and 721b are located in FIG. 5C along the range axis at the points of tangency 778a and 778b.

According to an aspect of the disclosure, a parallel covariance ellipsoid projection method is used to aid in calculating the radar acquisition search volume (search volume) extents. The use of parallel projection allows simplification of the calculations. Accordingly, a method is disclosed herein for searching an angular region of the search volume about a given cued direction and with a maximum range. The radar search of the designated volume may be performed with sequentially applied radar beams having defined beamwidths from a radar face defining a plane. In the method, error information relating to the cued direction is acquired, and, from the error information, the azimuth and elevation extents and centers of the search volume about the cue direction are determined, with the positions of the elevation and azimuth centers and the corresponding extents being the primary issues.

As stated above, the radar search of the designated volume may be performed with sequentially applied radar beams having defined beamwidths from a radar face defining a plane. In so doing, the angular extent of each beam in azimuth and elevation is determined. From the angular extents in azimuth and elevation for each beam, the number of beams required to cover the acquisition face of the search volume is determined. The dwell time for each of the beams is determined, given the search range. The search time is determined by taking the product of the number of beams multiplied by the dwell time per beam. The search time is compared with a maximum allowable search time, and radar scanning is initiated over the acquisition face with the calculated number of beams if the search time is less that the maximum allowable search time. If the search time is determined to exceed the allowable search time, the search face is partitioned into sub-search-faces, and radar scanning is initiated for each of the sub-search-faces. In accordance with the method, the azimuth and elevation extent of the search volume about the cue direction is determined by projecting a three-dimensional (3D) covariance ellipsoid onto the range-traverse plane and onto the range-elevation plane to produce a two-dimensional (2D) ellipse on each of the range-traverse and range-elevation planes. The maximum extents in each of the range-traverse and range-elevation planes are determined. The ranges to the two-dimensional ellipses at which the maximum extents occur are determined. From the ranges, and the two-dimensional ellipses, the subtended angles for the ranges at which the maximum extents occur are determined. The sum of these subtended angles is deemed to be the total extent in the elevation and traverse directions. The midpoints of the summed subtended angles are determined to identify the center of the acquisition face of the radar. The new or actual extents are deemed to be one-half of the summed angles.

The method may be understood by considering that, in the range-traverse plane, there are a maximum and a minimum traverse extent (see ellipse 715 in FIG. 5C), corresponding to the maximum "extent" of the projected ellipsoid in the positive traverse direction, and the maximum "extent" in the negative traverse direction (see ellipse 715 in FIG. 5B). These extremal points are typically at different ranges from the observer. These ranges are calculated, and then the azimuth extents are calculated (one may be positive, the other may be negative) as the angles between these range lines and the nominal range (from the observer to the center) of the projected ellipsoid (ellipse 715). These two azimuths will typically be unequal. The midpoint between them will be the azimuth center of the acquisition face, and in general is unequal to the azimuth of the center of the ellipsoid (ellipse 715). The (positive) difference between either azimuth extent and the new azimuth center is the azimuth extent of the acquisition face. The same considerations apply to calculation of elevation center and extents.

The extents 721a and 721b of FIG. 5C determined by this method no longer exclude all of the portion 724 (shown in FIG. 5B) of ellipse 715. Additionally, there is no region in FIG. 5C corresponding to region 728 of FIG. 5B, which represents a region which is searched, but which is unlikely to contain the target because it is outside the ellipse 715 projected from the covariance ellipsoid 714.

Figure 1:
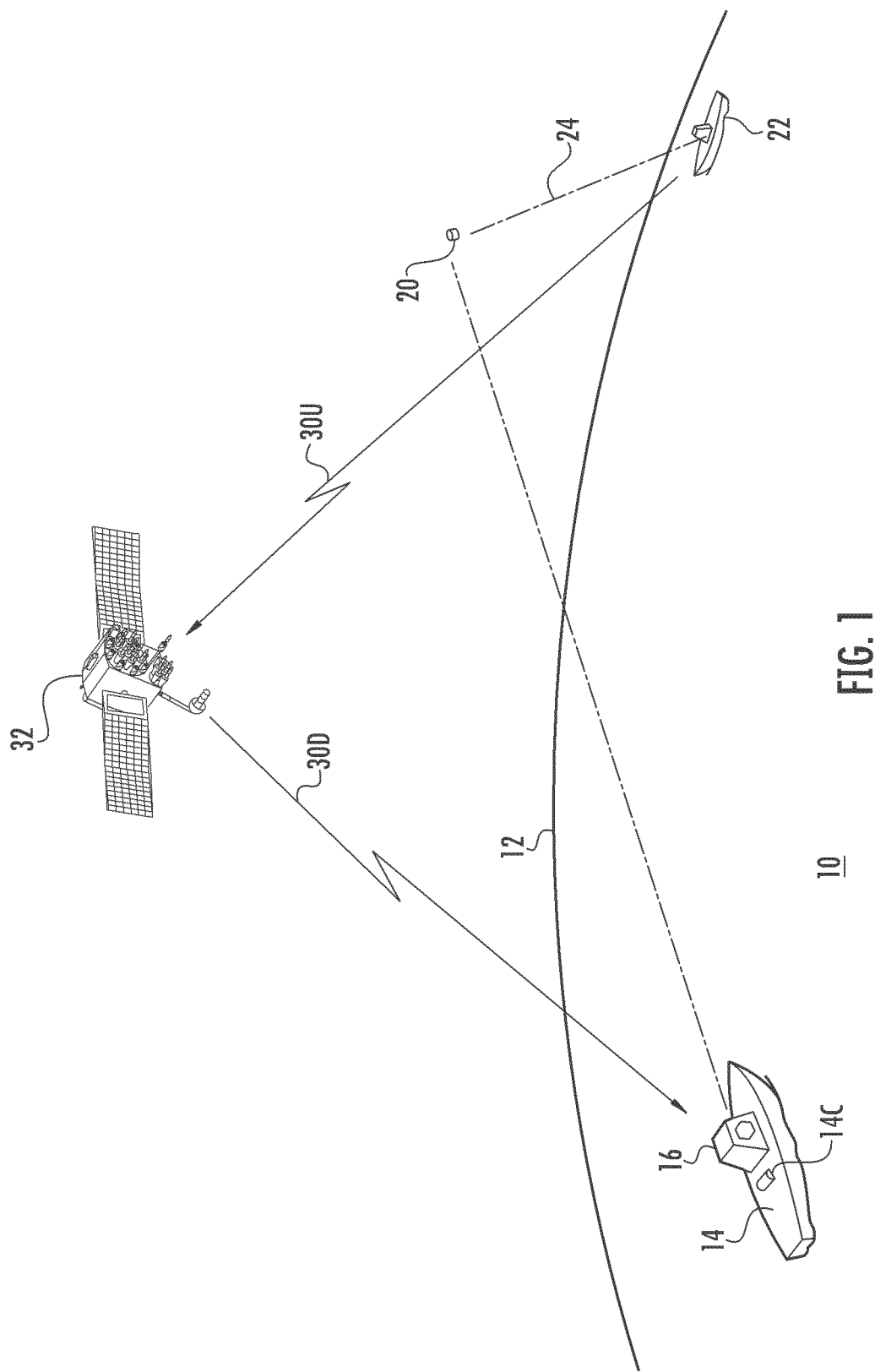
FIG. 1 is a simplified representation of a scenario in which a radar-equipped ship receives cue information relating to a target from a remote sensor as described in U.S. patent application Ser. No. 12/208,588, filed Sep. 11, 2008 in the name of Friesel.
Figure 4:
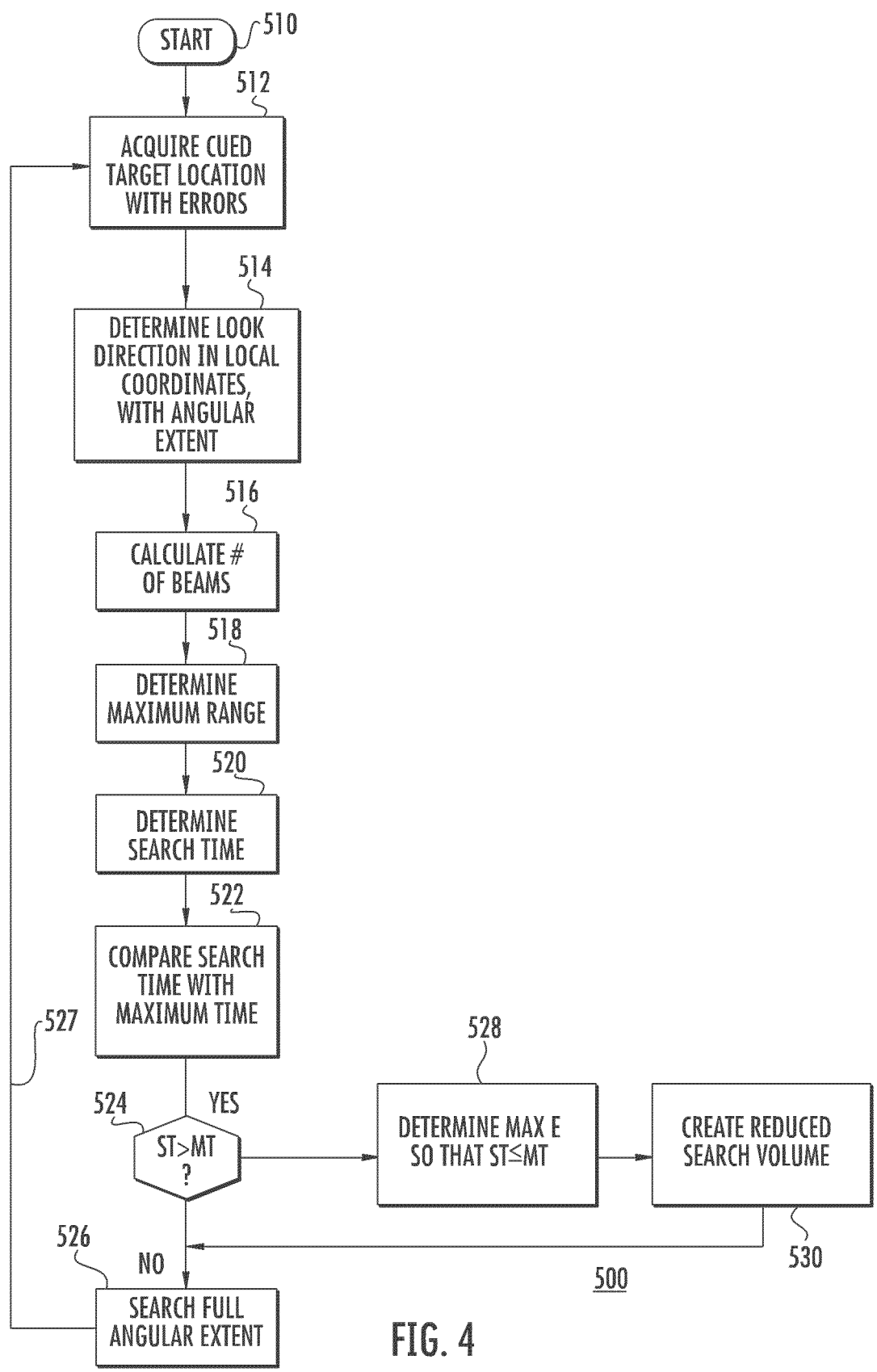
FIG. 4 is a flow chart illustrating a method for searching an angular region of the radar acquisition search volume about a given cued direction.

FIG. 4 is a flow chart illustrating a method for searching an angular region of the radar acquisition search volume about a given cued direction using the above described methods and with a given maximum search range, where the radar search of the designated volume is performed with sequentially generated radar beams having defined beamwidths. The method may be performed in computer 14c (FIG. 1), in the radar beam control represented by block 218 (FIG. 2), or may be distributed between them. In FIG. 4, logic 500 begins at START block 510, and flows to a block 512, which represents acquisition of cued target information, together with error information. In block 514, the location of the target relative to ownship is determined from the cue information, and the azimuth and elevation extent of the acquisition face are calculated according to the methods described herein. Block 516 represents the calculation of the number of beams required to fill the acquisition face.

The range of the search volume is determined in block 518 in order to estimate search time per beam, as known in the art. Command and decision block 216 of FIG. 2 multiplies the range-dependent time with (or by) the number of beams in block 520, and arrives at a scan or search time for the number of beams associated with the acquisition face. In block 522, the scan or search time ST is compared with the maximum allowable time MT. The maximum allowable time MT is that time at which the search aborts. Block 524 evaluates the comparison, ST>MT. The logic leaves decision block 524 by the NO output if the scan time is less than the maximum time, and flows to a block 526. Block 526 represents the searching of the full extent. Once the search of the full extent has begun, the logic returns by path 527 from block 526 to block 512 to acquire new cue information for processing during the next scan. If decision block 524 finds that the scan of the full extent will exceed the maximum time, the logic leaves the decision block by the YES output, and flows to block 528. Block 528 creates a modified search volume, by calculating a maximum search elevation such that the search time of this modified volume will be less than or equal to the maximum search time.

Figure 6A:
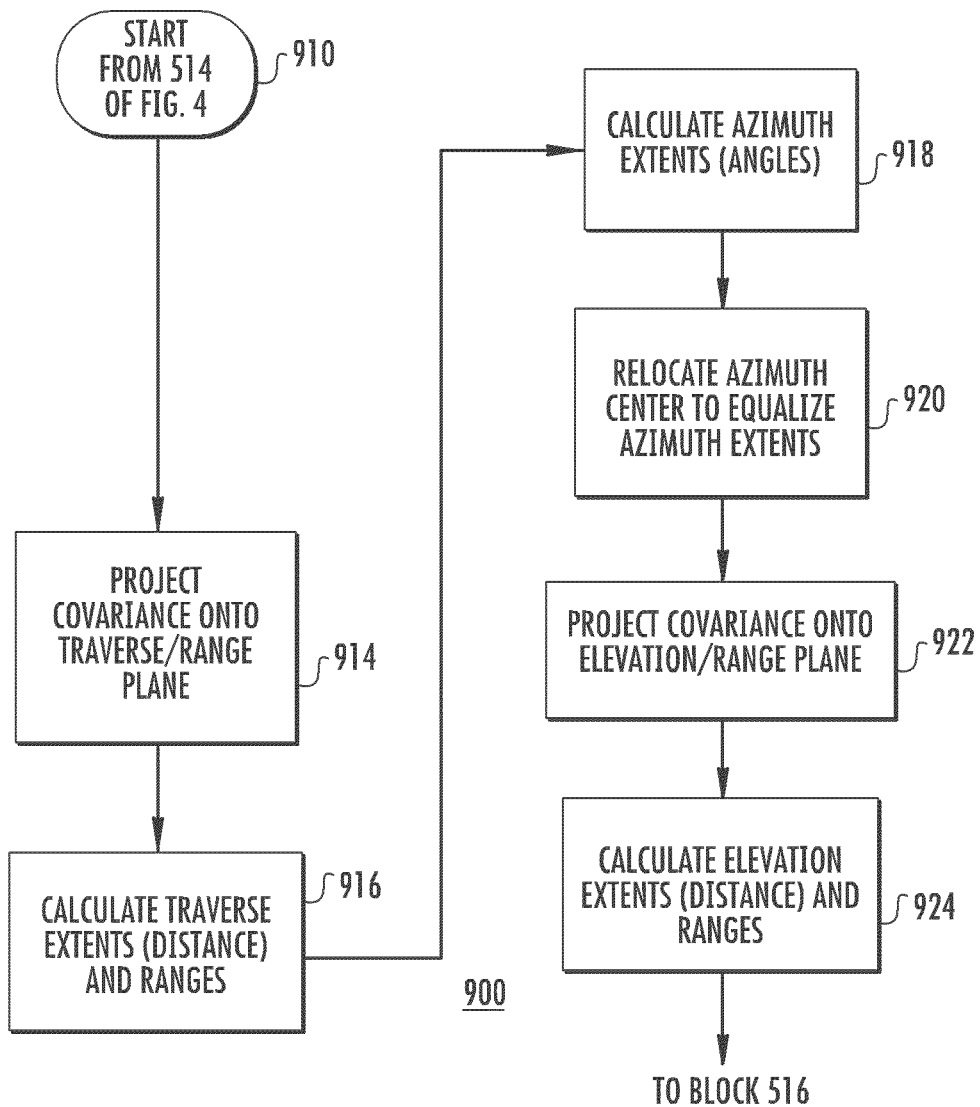
FIG. 6A represents a logic or control flow chart or diagram illustrating steps according to aspects of the disclosure.

FIG. 6A is a flow chart of the method of block 514 of FIG. 4 for determining the extents. The method starts at a START block 910 and flows to block 914, which represents projection of the covariance ellipsoid 714 onto the range/traverse plane as covariance ellipse 715 shown in FIG. 5B. In block 916, the maximum traverse extents of the ellipse 715 normal to the range are calculated. This is a first determination of the actual extents. Block 918 represents the calculation of the tangent vector angles, i.e. the positive and negative azimuth extents. These may be used as an indication of the actual extents. To obtain a better result, in block 920, the azimuth center is recalculated to equalize the magnitudes of the two azimuth extents. The re-centered azimuth extents may be deemed to be the actual azimuth extents. In block 922, the covariance ellipsoid is projected onto the range/elevation plane as covariance ellipse 715 shown in FIG. 5C. Block 924 represents processing identical to that of blocks 916 through 922, but for calculation of elevation extents. The overall problem resolved by the calculations set forth in conjunction with the flow chart of FIG. 6A may be formulated, in part, as the finding of the projections of the covariance matrix C $$C = \begin{pmatrix} c_{11} & c_{12} & c_{13} \\ c_{21} & c_{22} & c_{23} \\ c_{31} & c_{32} & c_{33} \end{pmatrix} = \begin{pmatrix} c_1 & c_4 & c_6 \\ c_4 & c_2 & c_5 \\ c_6 & c_5 & c_3 \end{pmatrix} \quad (12)$$

where:

$c_{xy}, \ldots$ are elements of the covariance matrix; and $c_n, \ldots$ are a simplified representation enabled by symmetry considerations.

Figure 6B:
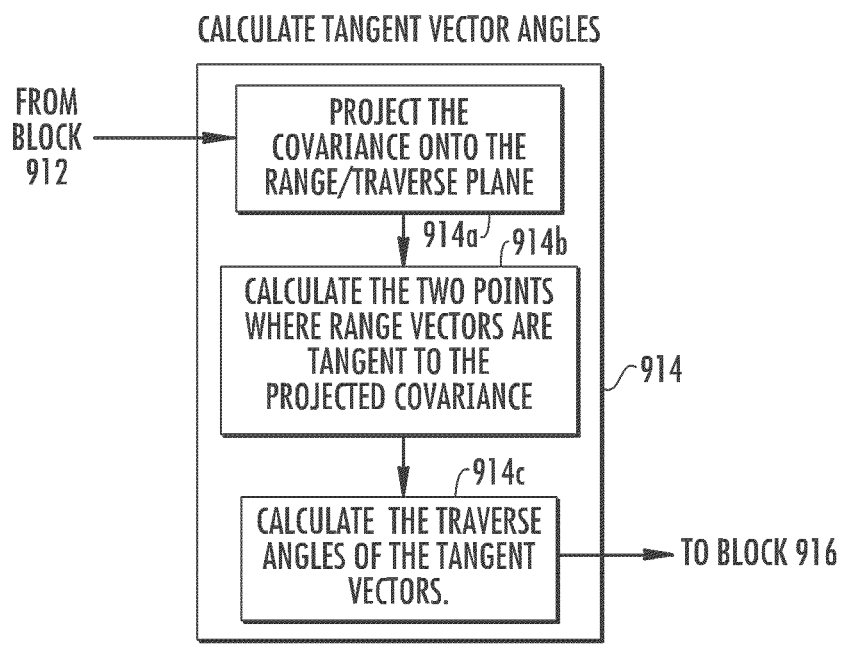
FIGS. 6B, 6C, 6D, and 6E, are logic flow charts or diagrams illustrating steps of FIG. 6A in more detail.

Referring now to FIG. 6B, block 914a represents the projection of the covariance ellipsoid 714 onto the range-traverse plane by projection normal to the elevation axis, thereby giving the covariance ellipse 715

$$B_{RT} = \begin{pmatrix} c_1 & c_4 \\ c_4 & c_2 \end{pmatrix} \quad (16)$$

which may be deemed to define the actual extents.

Block 914b, represents calculation of the two points at which range vectors are tangent to the covariance ellipse 715. The solution is found by calculating the two points (778a and 778b of FIG. 5C) at which lines 716a, 716b, parallel to range vector 701, are tangent to the ellipse 715.

Referring to FIG. 5C, the range vector 701 has length $r_0$ (range $r_0$) that extends from the viewpoint 700ae to the center of the ellipse 715. The maximum extent of the covariance ellipse 715 in a given direction is known to be the square root of the diagonal element (maximum extent 721b) that corresponds with that direction, typically $T = \sqrt{\sigma_2}$ for traverse (azimuth), and $E = \sqrt{\sigma_3}$ for elevation. The range from the radar viewplane 710 to the point of maximum extent is found from the nominal range $r_0$ and the additional range $\Delta r$ extending from the center (target location 708) of the ellipse 715 to the point 780 where the extent 721b intersects range axis 701a. For the traverse extent $$\Delta r^2 + \Delta r 2T\left(\frac{\sigma_4}{\sigma_2}\right) + T^2\left(\frac{\sigma_1}{\sigma_2}\right) = \frac{\sigma_1 \sigma_2 - \sigma_4^2}{\sigma_2}$$

with solution $\Delta r = \sigma_4/T$, the range from the viewplane 710 to the maximum (+) and minimum (−) traverse extents 721b and 721a, respectively, is then $R_T(\pm) = r_0 \pm \sigma_4/\sqrt{\sigma_2}$.

The actual extents may be deemed to be the extents defined by the traverse angles of the tangent vectors. The maximum and minimum azimuthal extents $\Delta T_+$ and $\Delta T_-$ may be found from $$\Delta T_\pm = \tan^{-1}\left(\frac{\pm \sqrt{\sigma_2}}{R_T(\pm) \cos(E_C)}\right)$$

where $E_C$ is the elevation of center (not visible in FIG. 5C) of the covariance ellipse 715.

Figure 6C:
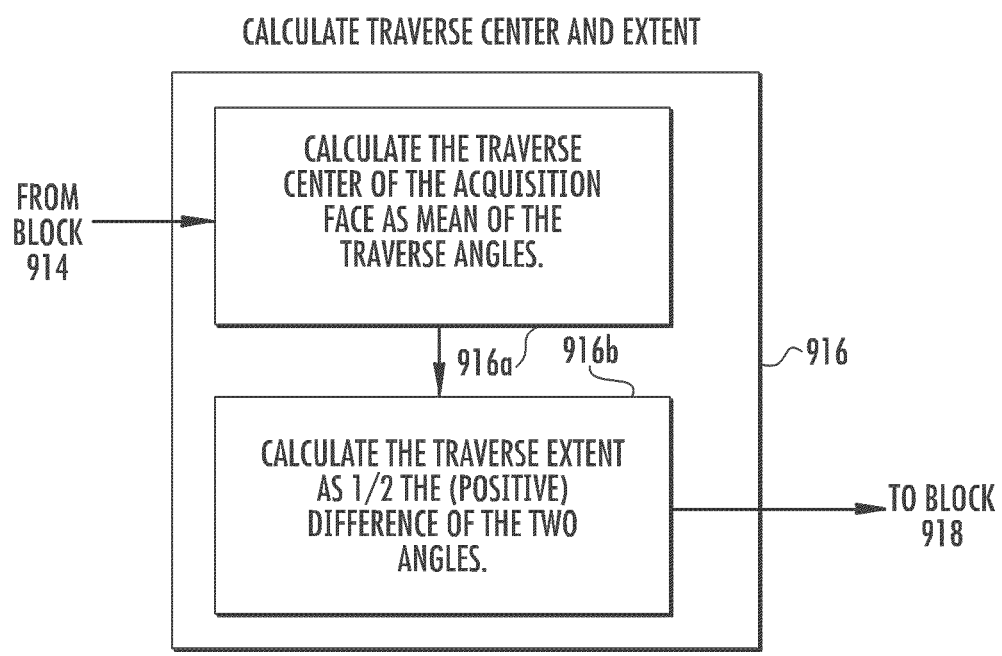

Referring again to FIG. 6B, from block 914c, the logic 900 flows to a block 916a of FIG. 6C. Block 916a represents the calculation of the traverse center of the acquisition face as the mean of the traverse angles $$T_0 = T_C + \frac{1}{2}(\Delta T_+ + \Delta T_-)$$

where $T_C$ is the traverse center of the covariance ellipsoid C. From block 916a of FIG. 6C, the logic 900 flows to a block 916b. Block 916b represents calculation of the traverse extent. This calculation involves half the positive difference of the two traverse angles 722a and 722b $$T_{ext} = |\Delta T_+ - \Delta T_-|/2.$$

Figure 6D:
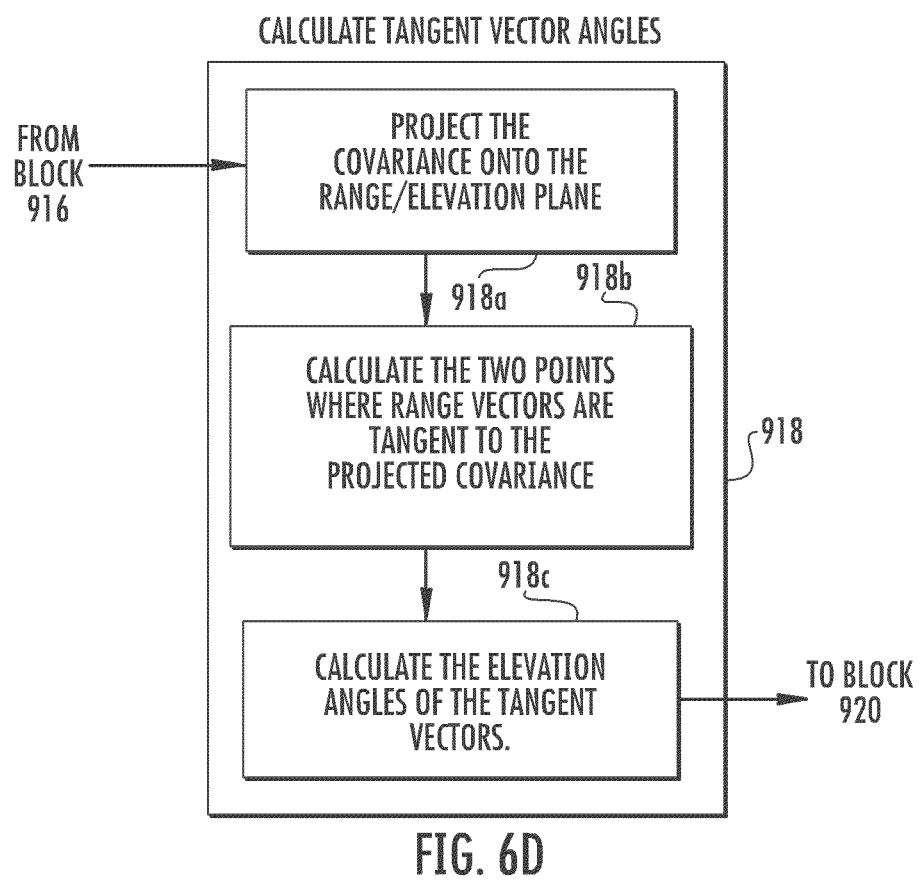

From block 916b of FIG. 6C, the logic 900 flows to a block 918a of block 918 of FIG. 6D. Block 918a represents projection of the covariance onto the range-elevation plane. The maximum extent $E = \sqrt{\sigma_3}$ for elevation. The range from the viewplane to the point of maximum extent is found from the nominal range $r_0$ and the additional range $\Delta r$ extending from the center of the ellipsoid to the point where the extent intersects the range axis. For the elevation extent $$\Delta r^2 + \Delta r 2E\left(\frac{\sigma_4}{\sigma_2}\right) + E^2\left(\frac{\sigma_1}{\sigma_2}\right) = \frac{\sigma_1 \sigma_2 - \sigma_4^2}{\sigma_2}$$

must be solved with solution $\Delta r = \sigma_6/E$. In block 918b, the range from the viewplane to the maximum (+) and minimum (−) elevation extents are $$R_E(\pm) = r_0 \pm \sigma_6/\sqrt{\sigma_3}.$$

In block 918c, the actual extents may be deemed to be the extents defined by the elevation angles of the tangent vectors. The maximum and minimum elevation extents $\Delta E_+$ and $\Delta E_-$ may be found from $$\Delta E_\pm = \tan^{-1}\left(\frac{\pm \sqrt{\sigma_3}}{R_E(\mp)}\right).$$

Figure 6E:
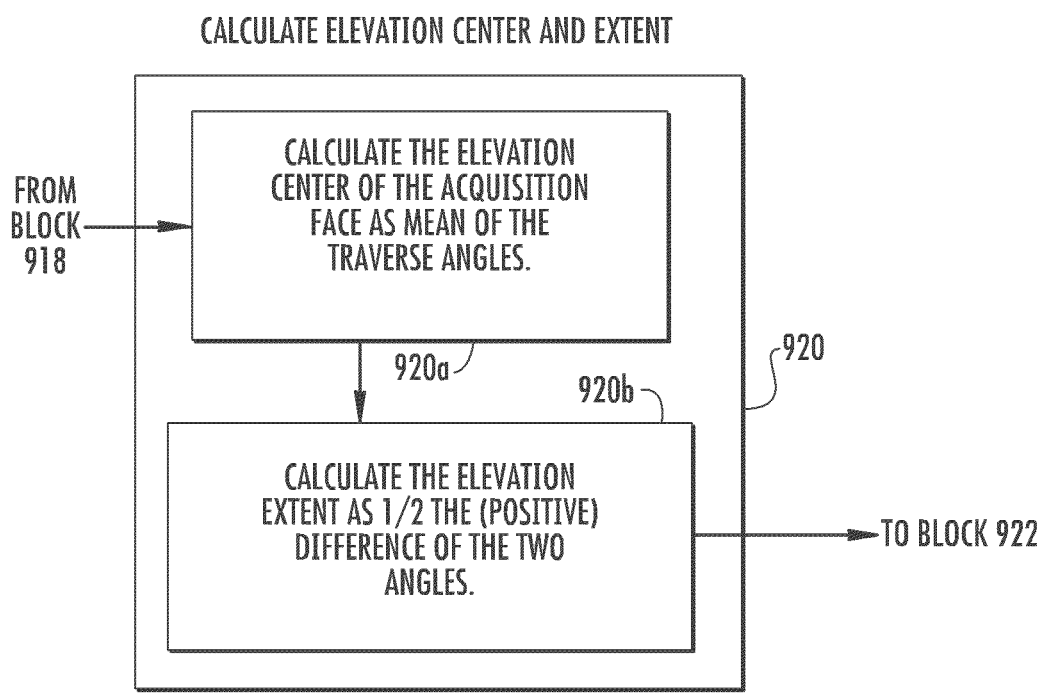

Block 920a of FIG. 6E represents the calculation of the angle of the elevation center $E_0$ of the acquisition face as the mean of the elevation angles $$E_0 = E_C + \frac{1}{2}(\Delta E_+ + \Delta E_-).$$

From block 920a, the logic 900 of FIGS. 6A, 6B, 6C, 6D, and 6E, flows to a block 920b. Block 920b calculates the elevation extent as one-half the positive difference between the two angles $$E_{ext} = |\Delta E_+ - \Delta E_-|/2.$$

The calculations performed in block 920 of FIG. 6E represent the last calculations which differ significantly from those of the prior art. Once the centers of the covariance ellipse, and the extents in the elevation and traverse directions are determined, the calculations that are performed are substantially identical to those performed in blocks 516 through 526 of FIG. 4, which operate in a legacy mode to schedule the beams and send them to the antenna face. The result is that the angular extents of the acquisition face are more accurately defined, improving coverage of the desired search volume and reducing the likelihood that search beams will be placed outside the desired search volume.

The use of the principles of the disclosure improves the accuracy and placement of the acquisition volume. This in turn increases the likelihood of finding a designated target.

Figure 7:
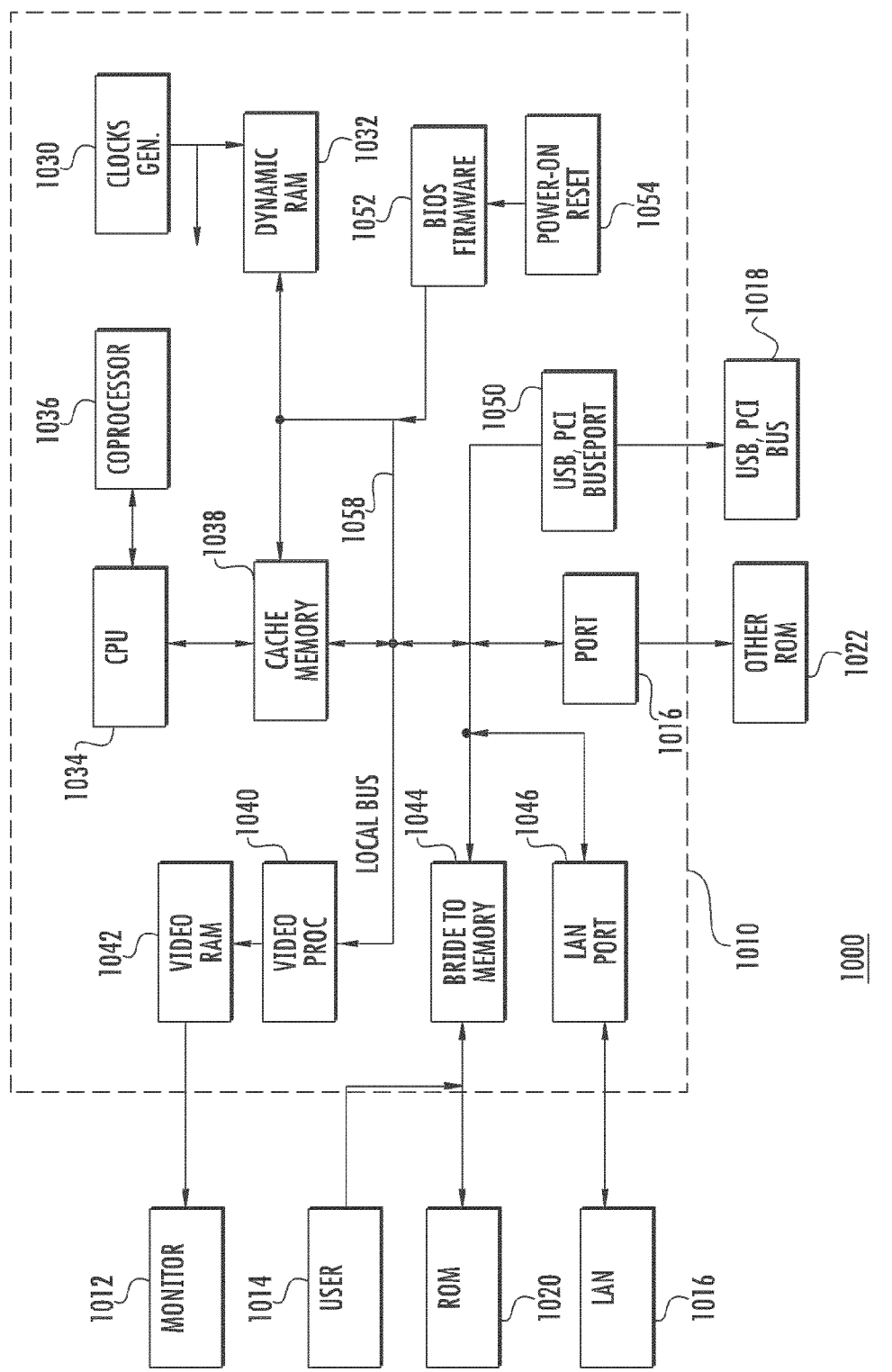
FIG. 7 is a simplified diagram in block and schematic form illustrating a representative computer which may be used to aid in performing processing and calculations pursuant to the disclosure.

FIG. 7 is a simplified diagram in block and schematic form illustrating a representative computer which may be used as 14c or 218. In FIG. 9, computer 1000 includes a processor or board 1010 and outboard elements such as a monitor 1012, user controls such as a keyboard and/or mouse, illustrated as a block 1014, local area network (LAN) 1016, additional buses 1018 such as PCI and or USB, and read-only memory (ROM) 1020, which is ordinarily a hard drive, and additional ROM 1022, which may be, for example, a flash memory stick or capacitance disk (CD). The main portion of the computer processor or board 1010 includes a central processing unit (CPU) 1034, which communicates with a cache dynamic memory 1038. At initial turn-on of the computer 1000, a power-on reset illustrated as a block 1054 enables a preloaded basic input/output system (BIOS) flash memory, which loads cache 1038 with information that initializes the booting sequence by the CPU. When booted, CPU 1034 may communicate with a coprocessor illustrated as 1036, and also communicates with main dynamic memory (DRAM) 1032 and a local bus 1058. Local bus 1058 provides communication between the CPU and other elements of the computer, as for example the video processor 1040 and video random-access memory 1042 for driving a monitor. Local bus 1058 also communicates by way of a bridge 1044 to external ROM 1020 and to user controls 1018. Local bus 1058 further communicates by way of a port 1048 with other ROM 1022 if desired, by way of a USB or PCI bridge or port 1050 with external buses, and or by way of a local area network (LAN) port 1046 with a LAN 1016. Those skilled in the art will understand how to use one or more computers to perform the processing required by elements of the disclosure.

Although the method and system have been described in terms of exemplary embodiments, it is not limited thereto. Rather, the appended claims should be construed broadly, to include other variants and embodiments of the method and system, which may be made by those skilled in the art without departing from the scope and range of equivalents of the method and system.

What is claimed is:

1. A method for estimating a radar search volume, the method comprising:
   acquiring covariance information relating to a cued direction, the covariance information having an ellipsoidal shape;
   projecting the ellipsoidal shape covariance information onto a range-traverse plane and onto the range-elevation plane to produce a covariance ellipse on the range-traverse and range-elevation planes; and
   determining, using a computer processor, the maximum extents in each of the range-traverse and range-elevation planes, the azimuth and elevation extents defining the search volume.

2. The method according to claim 1, further comprising calculating azimuth and elevation angles of the azimuth and elevation extents.

3. The method according to claim 2, further comprising:
   relocating azimuth and elevation centers to equalize the azimuth and elevation extents; and
   deeming the azimuth and elevation extents so equalized to be actual azimuth and elevation extents of the search volume.

4. The method according to claim 3, wherein the azimuth and elevation angles and centers are calculated and relocated after determining the maximum extents.

5. The method according to claim 1, wherein the azimuth and elevation extents are deemed to be actual azimuth and elevation extents.

6. The method according to claim 1, wherein the projecting of the covariance ellipsoid includes:
   calculating the two points at which the range vectors are tangent to the projected covariance; and
   calculating the traverse angles of the tangent range vectors.

7. The method according to claim 1, wherein the determining the maximum extents in each of said range-traverse and range-elevation planes comprises the steps of:
   calculating the traverse center of the acquisition face as the midpoint of the traverse angles; and
   calculating the traverse extent as one-half of the difference of the two angles.

8. The method according to claim 7, wherein the calculating of the traverse extent as one-half of the difference of the two traverse angles includes calculating the traverse extent as one-half of the positive difference of the two traverse angles.

9. A radar system for searching an angular region of a radar search volume, the radar system comprising:
   a radar beam generator for generating radar beams at a search face of the search volume;
   a source for providing covariance information relating to a cued direction, the covariance information having an ellipsoidal shape; and
   a processor coupled to the source and to the radar beam generator, the processor executing instructions for:
      projecting the ellipsoidal shape covariance information onto a range-traverse plane and onto the range-elevation plane to produce a covariance ellipse on the range-traverse and range-elevation planes; and
      determining the maximum extents in each of the range-traverse and range-elevation planes, the azimuth and elevation extents defining the search volume.

10. The radar system according to claim 9, wherein the instructions executed by the processor further comprise calculating azimuth and elevation angles of the azimuth and elevation extents.

11. The radar system according to claim 10, wherein the instructions executed by the processor further comprise:
   relocating azimuth and elevation centers to equalize the azimuth and elevation extents; and
   deeming the azimuth and elevation extents so equalized to be actual azimuth and elevation extents of the search volume.

12. The radar system according to claim 11, wherein the azimuth and elevation angles and centers are calculated and relocated after determining the maximum extents.

13. The radar system according to claim 9, wherein the azimuth and elevation extents are deemed to be actual azimuth and elevation extents.

14. The radar system according to claim 9, wherein the projecting of the covariance ellipsoid includes:
   calculating the two points at which the range vectors are tangent to the projected covariance; and
   calculating the traverse angles of the tangent range vectors.

15. The radar system according to claim 9, wherein the determining of the maximum extents comprises:
   calculating the traverse center of the acquisition face as the midpoint of the traverse angles; and calculating the traverse extent as one-half of the difference of the two angles.

16. The radar system according to claim 15, wherein the calculating of the traverse extent as one-half of the difference of the two traverse angles includes calculating the traverse extent as one-half of the positive difference of the two traverse angles.

17. A non-transitory computer-readable storage medium for estimating a radar search volume, the computer-readable storage medium having processor-executable instructions stored, which instructions, when executed by a processor, cause the processor to:

project ellipsoidal shaped covariance information relating to a cued direction onto a range-traverse plane and onto a range-elevation plane to produce a covariance ellipse on the range-traverse and range-elevation planes; and determine the maximum extents in each of the range-traverse and range-elevation planes, the azimuth and elevation extents defining the search volume.

18. The non-transitory computer-readable storage medium of claim 17, wherein the instructions further cause the processor to:

calculate azimuth and elevation angles of the azimuth and elevation extents;

relocate azimuth and elevation centers to equalize the azimuth and elevation extents; and determine the azimuth and elevation extents so equalized to be actual azimuth and elevation extents of the search volume.

19. The non-transitory computer-readable storage medium of claim 17, wherein the instructions further cause the processor to:

calculate the two points at which the range vectors are tangent to the projected covariance; and calculate the traverse angles of the tangent range vectors.

20. The non-transitory computer-readable storage medium of claim 17, wherein the instructions causing the processor to determine the maximum extents in each of said range-traverse and range-elevation planes further comprises causing the processor to:

calculate the traverse center of the acquisition face as the midpoint of the traverse angles; and calculate the traverse extent as one-half of the positive difference of the two traverse angles.

* * * * *